(12) United States Patent
Krivohlavek

(10) Patent No.: US 7,081,492 B1
(45) Date of Patent: Jul. 25, 2006

(54) AMBIENT TEMPERATURE ANHYDROUS LIQUID CROSS-LINKING AGENT

(76) Inventor: Dennis Krivohlavek, 10236 E. Rose Glenn Dr., Claremore, OK (US) 74017

( * ) Notice: Subject to any disclaimer, the term of this patent is extended or adjusted under 35 U.S.C. 154(b) by 0 days.

(21) Appl. No.: 09/872,034

(22) Filed: Jun. 1, 2001

Related U.S. Application Data

(63) Continuation-in-part of application No. 09/570,511, filed on May 16, 2000, now Pat. No. 6,451,886.

(51) Int. Cl.
*C08K 5/01* (2006.01)
(52) U.S. Cl. ............... 524/476; 524/481; 524/484; 524/486
(58) Field of Classification Search ........... 524/476, 524/481, 484, 486
See application file for complete search history.

(56) References Cited

U.S. PATENT DOCUMENTS

| | | | | |
|---|---|---|---|---|
| 3,689,450 A * | 9/1972 | Warner | ........ | 524/113 |
| 4,145,322 A | 3/1979 | Maldonado et al. | ........ | 260/28.5 |
| 4,147,854 A * | 4/1979 | Skillicorn | ........ | 526/312 |
| 4,412,019 A | 10/1983 | Kraus | ........ | 524/71 |
| 4,499,215 A | 2/1985 | Okada | ........ | 523/450 |
| 4,554,313 A | 11/1985 | Hagenbach et al. | ........ | 525/54.5 |
| 4,567,222 A | 1/1986 | Hagenbach et al. | ........ | 524/476 |
| 4,882,373 A | 11/1989 | Moran | ........ | 524/68 |
| 5,070,123 A | 12/1991 | Moran | ........ | 524/69 |
| 5,095,055 A | 3/1992 | Moran | ........ | 524/59 |
| 5,256,710 A | 10/1993 | Krivohlavek | ........ | 524/59 |
| 5,270,361 A | 12/1993 | Duong et al. | ........ | 524/68 |
| 5,693,132 A | 12/1997 | Kluttz et al. | ........ | 106/273.1 |
| 5,750,598 A | 5/1998 | Krivohlavek et al. | ........ | 524/71 |
| 5,990,203 A | 11/1999 | Cheng et al. | ........ | 523/450 |
| 6,011,095 A | 1/2000 | Planche et al. | ........ | 524/68 |
| 6,020,404 A | 2/2000 | Planche et al. | ........ | 523/450 |
| 6,025,418 A | 2/2000 | Defoor et al. | ........ | 524/71 |
| 6,031,029 A | 2/2000 | Baumgardner et al. | ........ | 524/68 |
| 6,117,926 A | 9/2000 | Engber et al. | ........ | 524/29 |

OTHER PUBLICATIONS

Central Soya Co., Inc., Fort Wayne, IN, "The Industrial Lecithin Book", 1998.
Central Soya Co., Inc., Fort Wayne, IN, "The Lecithin Book", 1999.
Amoco Chemical Company, General Office, Chicago, IL "Amoco Polybutenes Physical Properties", Bulletin 2-23d, Apr. 16, 1999.
Amoco Chemical Company, General Office, Chicago, IL "Polybutene Modification of Paving Asphalt", Bulletin GRSR No. 121A, 1996.
Amoco Chemical Company, General Office, Chicago, IL "Amoco Polybutenes", Bulletin 12-N; "Thermoplastic and Rubber Modifier", p. 16; "Rubber Modifier", p. 19; "Asphalt Modifier", p. 20; "Polymer Compatibility", p. 27; no date given.
Raschig Corporation, Fine Chemicals Bulletin, p. 25 for "2-Allylphenol" and p. 26 through p. 28 for "Glycidyl Ethers and Rheological Additives", no date given.
Atofina, Philadelphia, PA, General Bulletin, "Polybd Resins", Revised Apr. 1996.
Morton, "Rubber Technology", second edition, Robert E. Krieger Publishing Co., p. 38-39.
Dean, Paul R. "Sulfur-olefin copolymers as Substitutes for Insoluble Sulfur in Natural Rubber Compounding", 134th meeting of the Rubber Division; American Chemical Society, Oct. 1988.

* cited by examiner

*Primary Examiner*—Bernard Lipman
(74) *Attorney, Agent, or Firm*—Head, Johnson & Kachigian

(57) ABSTRACT

An air hydrous cross-linking compound which is liquid at ambient temperature. The cross-linking compound includes at least one element chosen from Group VI-A of the periodic table of elements and a natural or synthetic polymer.

25 Claims, 2 Drawing Sheets

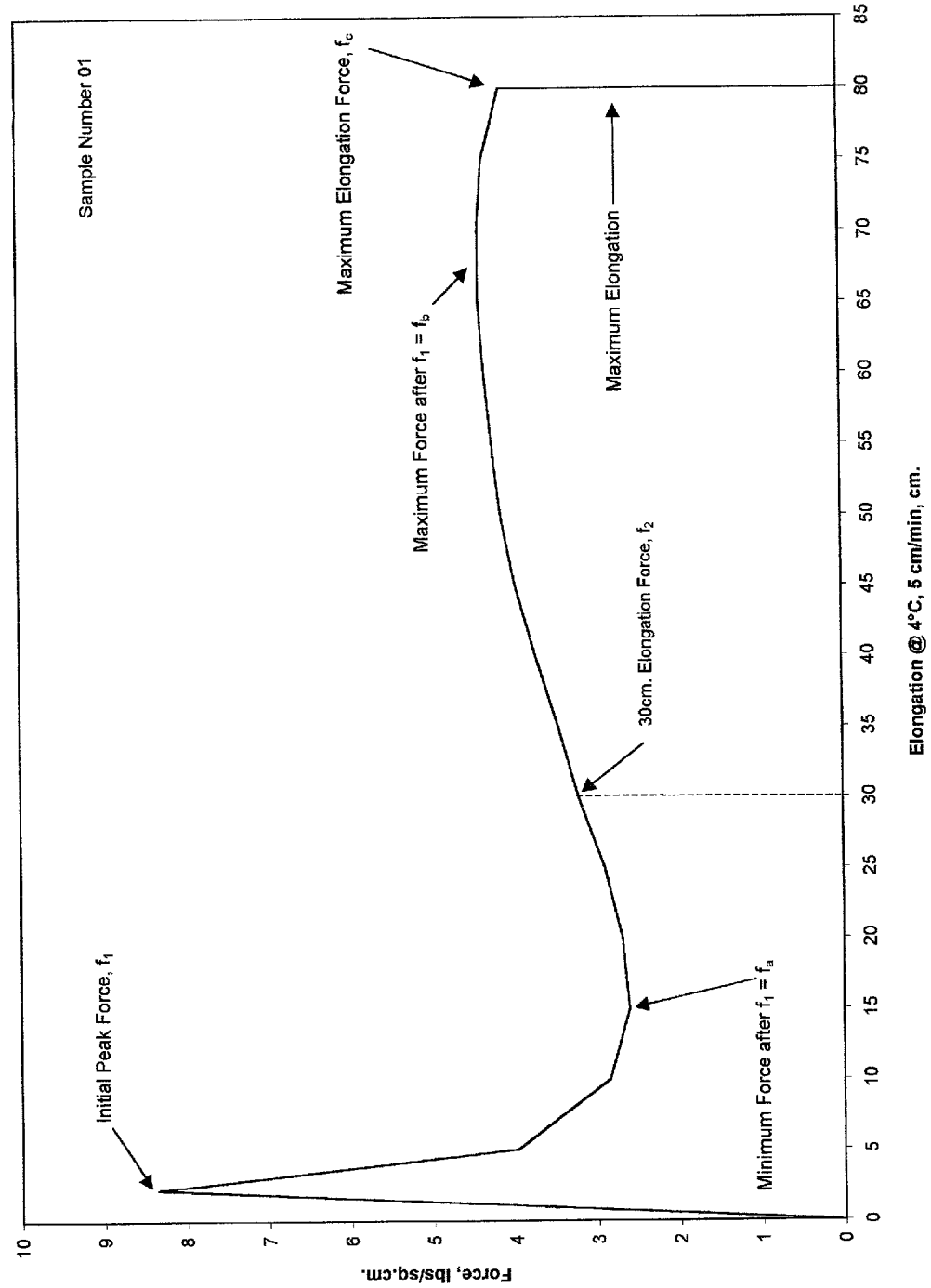

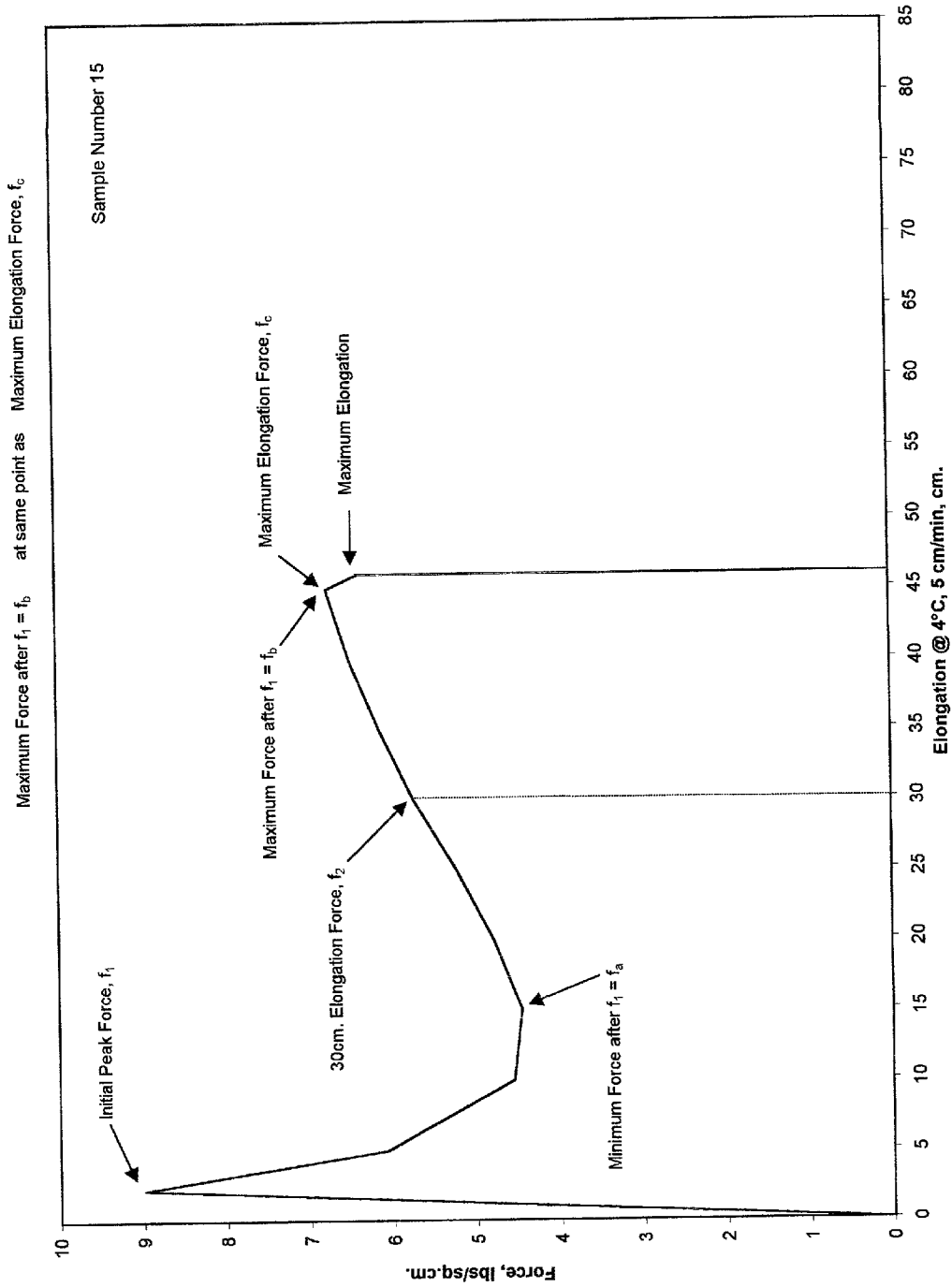

AMBIENT TEMPERATURE ANHYDROUS LIQUID CROSS-LINKING AGENT

CROSS REFERENCE TO RELATED APPLICATION

This application is a continuation-in-part patent application of U.S. patent application Ser. No. 09/570,511 filed May 16, 2000 now U.S. Pat. No. 6,451,886 entitled "Universal Cross-Linking Compound and Polymer" by Dennis Krivohlavek.

BACKGROUND OF THE INVENTION

1. Field of Invention

This invention is directed to cross-linking polymers and, particularly, polymer modified asphalt using an anhydrous cross-linking agent that is liquid at ambient temperatures.

2. Prior Art

U.S. Pat. No. 4,145,322 Maldonado et al. teaches that elemental sulfur may be used to cross-link styrene diene block copolymers. Maldonado et al. does not teach the art of lower molecular weight liquid at ambient temperature polymers in combination with Group VIA elements of the Periodic Table of Elements and optionally with polysulfides or phenols that may be in combination with natural oils or process oils from crude oil.

U.S. Pat. No. 4,412,019 by Gerard Kraus teaches that sulfur with hydrogenated rubber copolymer exhibit improved temperature viscosity stability and improved tensile properties. This invention does not teach the art of lower molecular weight liquid at ambient temperature polymers in combination with Group VIA elements of the Periodic Table of Elements and optionally with polysulfides or phenols that may be in combination with natural oils or process oils from crude oil.

U.S. Pat. No. 4,499,215 by Sadashige Okada teaches that asphalt/epoxy resin coating composition compatibility is improved by the addition of and reacting alkylphenol-formaldehyde resin with arylsulfonic acid catalyst. This work does not teach the art of lower molecular weight liquid at ambient temperature polymers in combination with Group VIA elements of the Periodic Table of Elements and optionally with polysulfides or phenols that may be in combination with natural oils or process oils from crude oil.

U.S. Pat. No. 4,554,313 by Hagenbach et al. teaches that organically bound polysulfides may be used in combination with asphalt, process oils from refining of crude oil or coal, vegetable oils and styrene conjugated diene copolymers of between 70,000 and 200,000 molecular weight units to form a mother solution. This mother solution is used in combination with asphalt and polymers to create a cross-linked polymer modified asphalt. This patent does not teach the art of lower molecular weight liquid at ambient temperature polymers in combination with Group VIA elements of the Periodic Table of Elements and optionally with polysulfides or phenols that may be in combination with natural oils or process oils from crude oil.

U.S. Pat. No. 4,567,222 by Hagenbach et al. teaches a continuation of U.S. Pat. No. 4,554,313 wherein the objective of these works was to eliminate the use of solid and or elemental sulfur from use in a bitumen polymer composition. This patent does not teach the art of lower molecular weight liquid at ambient temperature polymers in combination with Group VIA elements of the Periodic Table of Elements and optionally with polysulfides or phenols that may be in combination with natural oils or process oils from crude oil.

U.S. Pat. No. 4,882,373 to Moran relates to acidulation of asphalt followed by the addition of polymers and bubbling an oxygen-containing gas through the mixture. This patent does not teach the art of lower molecular weight liquid at ambient temperature polymers in combination with Group VIA elements of the Periodic Table of Elements and optionally with polysulfides or phenols that may be in combination with natural oils or process oils from crude oil.

U.S. Pat. No. 5,070,123 to Moran teaches that mineral acids in combination with various polymers in asphalt will improve the stability of the resulting product. The preferred acid is phosphoric acid. This patent does not teach the art of lower molecular weight liquid at ambient temperature polymers in combination with Group VIA elements of the Periodic Table of Elements and optionally with polysulfides or phenols that may be in combination with natural oils or process oils from crude oil.

U.S. Pat. No. 5,095,055 by Moran teaches improved product storage stability by the use of inorganic acid pretreatment of asphalt followed by the addition or incorporation of a polymer into said pretreated asphalt. The preferred acid is phosphoric acid. Moran does not teach the art of lower molecular weight liquid at ambient temperature polymers in combination with Group VIA elements of the Periodic Table of Elements and optionally with polysulfides or phenols that may be in combination with natural oils or process oils from crude oil.

U.S. Pat. No. 5,270,361 by Doung et al. teaches the use of the Group VIA element Selenium may be substituted for the Group VIA element Sulfur in reacting and processing natural or synthetic rubber or waste tires or tubes. Doung does not does not teach the art of lower molecular weight liquid at ambient temperature polymers in combination with Group VIA elements of the Periodic Table of Elements and optionally with polysulfides or phenols that may be in combination with natural oils or process oils from crude oil.

U.S. Pat. No. 5,256,710 by Krivohlavek teaches the use of reactive phenol-aldehyde resin or combinations of these resins with elemental sulfur may be used to create a reaction between pre-dispersed polymers and asphalt. This patent does not teach the art of lower molecular weight liquid at ambient temperature polymers in combination with Group VIA elements of the Periodic Table of Elements and optionally with polysulfides or phenols that may be in combination with natural oils or process oils from crude oil.

U.S. Pat. No. 5,990,203 by Cheng et al. relates to improving compatibility of random vinyl substituted aromatic/$C_4$–$C_6$ conjugated diolefin polymer/asphalt mixtures by modifying the polymer with epoxy or glycidyls, carboxyl, amine or ester functionality. Cheng et al. does not teach the art of lower molecular weight liquid at ambient temperature polymers in combination with Group VIA elements of the Periodic Table of Elements and optionally with polysulfides or phenols that may be in combination with natural oils or process oils from crude oil.

U.S. Pat. No. 5,693,132 by Kluttz et al. examined the art of using poly-phenol tar bottoms to improve asphalt. The asphalt may have various polymers blended or incorporated therein and may have the poly-phenol added either before, during or pre-blended with the polymer or after the addition of polymer(s). It is not made clear as to whether these phenol tar bottoms are liquid or made liquid by blending or dissolving in a compatible liquid for ease of use. Kluttz et al. do not teach that the phenol tar bottoms are reacted. Rather Kluttz et al. teach that the phenol tar bottoms are blended. Further, this art does not teach the art of lower molecular weight liquid at ambient temperature polymers in combination with Group VIA elements of the Periodic Table of Elements and optionally with polysulfides or phenols that may be in combination with natural oils or process oils from crude oil.

U.S. Pat. No. 5,750,598 to Krivohlavek et al. teaches that accelerators that are active below 100° C. may vulcanize bitumen/polymer compositions. The inventors do not discuss the combination of polysulfides and or liquid at ambient temperature polymers in combination with Group VIA Elements of the Periodic Table of Elements as a cross-linking agent or compound.

U.S. Pat. No. 6,011,095 to Planche, et al. teaches that olefinic polymers having epoxy or carboxyl groups which are blended and made homogeneous with asphalt are further reacted by incorporation of an acid additive. These polymers may be reacted with sulfur either before, during or after the addition of an acid additive. The preferred epoxy group is a glycidyl group while the preferred acid additive is phosphoric. There is no art taught concerning the art of lower molecular weight liquid at ambient temperature polymers in combination with Group VIA elements of the Periodic Table of Elements and optionally with polysulfides or phenols that may be in combination with natural oils or process oils from crude oil.

U.S. Pat. No. 6,025,418 to Defoor, et al. teaches that sulfur in combination with sulfur-containing derivatives which may or may not contain Zinc, Barium or Copper, plus an organic alkali such as an organic amine will improve the properties of a polymer modified asphalt. There is no art taught of lower molecular weight liquid at ambient temperature polymers in combination with Group VIA elements of the Periodic Table of Elements and optionally with polysulfides or phenols that may be in combination with natural oils or process oils from crude oil.

U.S. Pat. No. 6,031,029 by Baumgardner et al. describes system and methods for combining mineral acid and polymer additives in an asphalt composition. Baumgardner et al. teaches that mineral acid widens the temperature range in which satisfactory performance for polymer asphalt compositions may perform. The preferred mineral acid is phosphoric acid. In this art, mineral acid is the primary reactant. Baumgardner et al. do not teach the art of lower molecular weight liquid at ambient temperature polymers in combination with Group VIA elements of the Periodic Table of Elements and optionally with polysulfides or phenols that may be in combination with natural oils or process oils from crude oil.

U.S. Pat. No. 6,020,404 to Planche et al. teaches that elastomers and plastomers may be combined with at least one olefinic polymer containing epoxy or glycidyl or carboxyl groups. Planche et al. do not teach the art of lower molecular weight liquid at ambient temperature polymers in combination with Group VIA elements of the Periodic Table of Elements and optionally with polysulfides or phenols that may be in combination with natural oils or process oils from crude oil.

U.S. Pat. No. 6,117,926 by Engber et al. teach that a mineral acid, an electron pair acceptor acid and a low molecular weight organic acid (phosphoric acid preferred) promote chemical binding between an asphalt and available epoxy (glycidyl preferred) groups of a copolymer. Not taught is the art of lower molecular weight liquid at ambient temperature polymers in combination with Group VIA elements of the Periodic Table of Elements and optionally with polysulfides or phenols that may be in combination with natural oils or process oils from crude oil.

Other Publications

Central Soya Co., Inc., Fort Wayne, Ind., "The Industrial Lecithin Book", 1998

Central Soya Co., Inc., Fort Wayne, Ind., "The Lecithin Book", 1999

Amoco Chemical Company, General Office, Chicago, Ill. "Amoco Polybutenes Physical Properties," Bulletin 2–23d, Apr. 16, 1999

Amoco Chemical Company, General Office, Chicago, Ill. "Polybutene Modification of Paving Asphalt," Bulletin GRSR No. 121A, 1996

Amoco Chemical Company, General Office, Chicago, Ill. "Amoco Polybutenes," Bulletin 12-N; "Thermoplastic and rubber modifier," p. 16; "Rubber modifier", p19; "Asphalt modifier," p. 20; "Polymer compatibility," p. 27; no date given Raschig Corporation, Fine Chemicals Bulletin, p.25 for "2-Allylphenol" and p.26 through p.28 for "Glycidyl Ethers and Rheological Additives", no date given Atofina, Philadelphia, Pa., General Bulletin "Polybd® Resins," Revised 4/96

Morton, "Rubber Technology," second edition, Robert E. Krieger Publishing Co., p. 38–39

Dean, Paul R., "Sulfur-olefin copolymers as Substitutes for Insoluble Sulfur in Natural Rubber Compounding," $134^{th}$ meeting of the Rubber Division, American Chemical Society, October 1988

SUMMARY OF THE INVENTION

Prior to this invention, liquid cross-linking agents had been relegated to dispersions of the primary vulcanization agent plus accelerators plus other cross-linking aids in a dry or aqueous blend. Efforts in the past to create anhydrous liquids at ambient temperature cross-linking or vulcanization agent have met with limited commercial success. Most limiting to commercial success has been the cost of these anhydrous liquid at ambient temperature cross-linking or vulcanization agents in a final product due to increased use levels of the agent over conventional lower cost vulcanization agents.

It has been found that (in terms of cost, effectiveness in formulary and use levels) anhydrous liquid at ambient temperature cross-linking or vulcanization agents may be created by dissolving and or dispersing a primary vulcanization agent in a suitable anhydrous liquid. Such suitable anhydrous liquids may be, but are not limited to, organically bound polysulfides, various polymers having a molecular weight below 70,000 and naturally occurring oils, oils from various crude oil or coal processing, functional or reactive solvents such as but not limited to Neodecanoic oxiranylmethyl ester or various liquid epoxies or other organic reactive or functionalized liquids.

Typical non-limiting examples of primary vulcanization agents would be elements of Group VIA of the Periodic Table of Elements, phenolic resins such as phenol tar bottoms or various reactive phenol aldehyde compounds or epoxies or glycidyls or like or similar homologues which may be liquid or solid at ambient temperatures.

BRIEF DESCRIPTION OF DRAWINGS

FIG. 1 is an example of Charted Force-Ductility Data—Minimum Force after $f_1=f_{1mn}$ not at same point as Maximum Elongation Force, $f_3$ FIG. 2 is an example of Charted Force-Ductility Data—Minimum Force after $f_1=f_{1mn}$ at same point as Maximum Elongation Force, $f_3$

DETAILED DESCRIPTION OF THE PREFERRED EMBODIMENTS

The present application is a continuation-in-part of U.S. patent application Ser. No. 09/570,511 filed May 16, 2000, which is incorporated herein by reference.

The test procedures used to illustrate the utility of the invention are outlined by the American Society for Testing and Materials (ASTM) and by the American Association of State Highway and Transportation Officials or AASHTO. Therefore, testing by ASTM D4402 at 135° C. with Spindle No. 27 for Rotational Viscosity; AASHTO PP1 for Pressure Aging Vessel; AASHTO TP5 for Dynamic Shear Rheometer; AASHTO TP1 for Bending Beam Rheometer was used to illustrate the utility of a liquid at ambient temperature anhydrous cross-linking or vulcanizing agent.

Non American Society for Testing and Materials tests used to illustrate the teaching of this disclosure are as follows:

Percent Elastic Recovery of Bituminous Materials at 25° C.—Condition speciman per ASTM D113 and elongate at 5 cm/min to 20 cm. and stop. Allow speciman to relax 5 minutes then cut about the center. Leave specimen undisturbed for 60 minutes. Pull ductilometer head until cut ends of specimen touch. Record the reading on the Ductilometer as length L in centimeters to nearest quarter centimeter. Calculate the % Elastic Recovery (% ER) as follows: $((20-L)/20)\times 100=\%$ ER Force-Ductility of Bituminous Materials at 4° C., 5 cm/min Pull Rate—Replace the brass wedged side pieces of ductility mold from ASTM D113 with straight sided pieces. Attach one end of briquette clip to fixed position on pulling head of Ductilometer of ASTM D113. Attach other end of briquette clip to load or force cell in such a fashion as to place the loading chain parallel and in direct line with the test specimens such that load carried by the test specimens during testing will be transmitted directly to the load cells. Data was acquired by analog to digital processing in a computer. Conditionings of the sample briquettes were in accordance with ASTM D113. This general description of apparatus and procedure is as outlined by ASTM D04.44 Task Force—Force-Ductility of Bituminous Materials, 1986 and included here in by reference.

The Separation Test for Polymer Modified Bituminous Materials—In approximately 1 inch diameter by 5.5 inch length blind aluminum tubes pour approximately 50.0 grams of test specimen. Seal open end of tube by flattening and folding over twice. Store vertically in test tube rack undisturbed in 163° C. oven for 48 hours. Holding in vertical position, remove specimen from test tube rack and place vertically in approximately −4° C. freezer for a minimum of four hours. After freezing, cut specimen into about one third portions based upon weight as Top (T), Middle (M) and Bottom (B) portions. Discard the Middle (M) portion. Measure the Softening Point as per ASTM D36 of the Top (T) portion and Bottom (B) portion and record each respectively. Calculate the Separation (S) of the polymer from the asphalt or bitumen as follows: S=T−B.

The mix procedure for preparing the polymer modified asphalt experiments was, unless other wise noted, as follows:

01) To a round five-gallon bucket the formula amount of asphalt was added at about 180° C.
02) Mix by a 3.8 cm. turbine prop at 6 cm depth and a 2.8 cm. turbine prop at 14 cm depth on a single shaft and rotating at approximately 300 rpm at 160 to 163° C. with no vortexing of contents of can.
03) Add formula amount of polymer and continue mixing at temperature with no vortex.
04) Continue with Step 03) until polymer is dissolved or digested.
05) When polymer is dissolved or digested, record time to dissolve or digest.
06) Discontinue mixing and split contents of five-gallon can into round friction top quart cans containing 600 to 610 grams net in each quart can. Allow quart cans to cool to ambient temperature and use as needed.
07) Reheat quart can to 160 to 163° C. in oven.
08) Stir contents of can by means of a 3.4-cm. turbine prop at 4-cm. depth rotating at approximately 300 rpm.
09) Add Ambient Temperature Anhydrous Liquid Cross-linking Agent and continue mixing at temperature with no vortexing for four hours except as noted.
10) Remove from mixer, seal quart can and store in 135 to 150° C. oven over night except as noted.
11) Test sample after oven storage except as noted.

The method of preparation for each ambient temperature anhydrous liquid cross-linking agent is as follows:

01) To a 110-ml. round polyethylene specimen container (with snap top) add by weight the percentage components of the Ambient Temperature Anhydrous Liquid Cross-linking Agent in no particular order stirring contents between each component addition.
02) Stir contents thoroughly after final component addition.
03) Tip container on side to examine fluidity and optionally measure viscosity by rotational viscometer at 25° C. and record observations.
04) Seal contents of container by means of snap top lid and allow to set for up to 48 to 72 hours to examine settlement of contents.

For the purposes of this disclosure, the phrase "liquid at ambient temperature" means that if a container of the material of the invention is tipped on its side the contents will readily flow from the container. Broadly speaking in terms of low capital expenditures for pumps, a liquid at ambient temperature cross-linking agent resulting from the teachings of this art will have a rotational viscosity as measured by a Brookfield® viscometer of about but not limited to 30,000 centipoise or less at 25° Celsius. It is understood that within the purview of the teaching of this disclosure would be liquids or pastes of greater than 30,000 centipoise that can be pumped or injected by means of pumping or injection equipment designed for such purposes.

For the purposes of this disclosure, the term "polysulfides" will mean two or more sulfur groups or Group VIA Elements of the Periodic Table of Elements per molecule that are in terminal position on the molecule that may then enter into a vulcanization or cross-linking reaction or; may be made to cleave creating multiple sulfur or Group VIA element components having sulfur groups or Group VIA element groups in a terminal position or; made to cleave creating elemental sulfur or poly-sulfur or Group VIA or poly-Group VIA elements that may then enter into a vulcanization reaction. General non-limiting examples of the Group VIA element sulfur, such chemical moieties would be: at minimum a di-mercaptans which would have two SH groups or; a poly-mercaptan which would have more than two SH groups per molecule or; organically bound sulfur molecules having more than two —S—S— bonds per molecule.

Polysulfides as defined above are commercially available in many liquid forms. Non-limiting examples of such commercially available polysulfides are:

Di-tert-butyl polysulfide of the general formula $C_8H_{18}S_X$ (X=4.0 average);

Di-tert-dodecyl polysulfide of the general formula $C_{24}H_{50}S_X$ (X=5.0 average);

Di-tert-nonyl polysulfide of the general formula $C_{18}H_{38}S_X$ (X=5.0 average);

p-Menthane-2,9-dithiol of the general formula $C_{20}H_{20}S_2$—a mercaptan having two SH groups; 1,2-Ethanedithiol of the general formula $C_2H_6S_2$—a mercaptan having two SH groups;

In accordance with this invention, various polymers are available that are liquid at ambient temperature. These liquids at ambient temperature polymers may or may not have various active or functional groups other than —C=C— functional groups attached to or made a component of the polymer. Two non-limiting examples of liquid at ambient temperature polymers are:

1,3-Butadiene homopolymer that is hydroxy-terminated;

Polybutene or Isobutylene/butene copolymer which contains at least one —C=C— group per molecule;

Ethylene Vinyl Acetate or Ethylene/Propylene or Ethylene/Butylene copolymers and like or similar homopolymers or polymers containing chemical moities of these components.

In general, liquid at ambient temperature polymers are less than 70,000 molecular weight units. However, it is now with in the scope of one skilled in the art to anticipate dispersing solid at ambient temperature polymers in a suitable liquid or solvent or combinations thereof and is therefore anticipated within the purview of the teachings of this disclosure.

Non-limiting examples of solvents that may be particularly well suited for dissolution of polymers or that would find utility within the scope of this disclosure would be oils distilled from refining crude oil or coal tars. Typical of but not limited to these solvents would be aromatic, napthenic or paraffinic process oils from the refining of crude oils. Other non-limiting examples would be kerosene, diesel, naphtha and like or similar oils. Other suitable oils or solvents now within the teachings of this disclosure that may or may not be refined from coal or crude oil or synthesized which may or may not contain functional or unsaturated groups such as but not limited to:

Vinyl groups or >—C=C—< groups;

Hydorxyl groups or >—OH groups;

Carboxyl groups or >—COOH groups;

Polysulfur or polysulfide or mercaptan groups or >—S—$S_x$—S— or >(—SH)$_x$ where X≧0;

Nitrogen groups or >—$NH_x$ (X>0) groups, or >—$NH_4OH$ or like or similar moieties;

Phosphorous groups or >—PZ groups where Z=$H_3O_4$ or $O_4$ or like or similar moieties;

Oxygen groups or >—O—O—<groups or >=O;

other nitrogen containing derivatives, various phosphorous containing derivatives, ketones or other oxygen containing derivatives or combinations thereof within the oil or solvents composition.

Other non-limiting examples of liquids or solvents that would find utility under the teachings of this disclosure would be liquids commonly knows as reactive solvents. Such solvents or liquids typically but not necessarily have some form of functionality in their molecular structure. Non-limiting examples of such liquids would be, but not limited to, epoxies or glycidyls or naturally occurring oils from animals or plants. Specific non-limiting examples of such solvents would be:

Neodecanoic acid, oxiranylmethyl ester—a glycidyl form of an epoxy ester reactive solvent;

Allyl glycidyl ether or higher homologues—a molecule with one or more glycidyl ether groups;

Glycidyl Methacrylate—a molecule containing both acrylic and epoxy groups;

Lecithin—an amine phosphate oil from the processing of Soya beans;

Vegetable oil—from various grains such as corn or Soya beans;

Hydrogenated Vegetable oil—unsaturation (—C=C—) removed by hydrogenation of vegetable oil;

Aldehydes—an non-limiting example of which would be furfural;

Tall oils, crude or refined—fatty acids and or rosin acids from the processing of trees.

The utility and practical application of phenols and their relative derivatives are also taught in this disclosure. Non-limiting examples of phenols would be:

Polyphenolic compounds such as bottoms from the processing of phenols;

Reactive phenolic resins commonly known as two-step and heat reactive or Novolac and Resols;

Bisphenol A;

Bisphenol B;

Other like or similar chemical moieties and their related derivatives such as but not limited to halogenated or having Group I elements of the Periodic Table of Elements attached to the molecule.

It is well understood in the art that covulcanization agents or accelerators may be used in combination with a cross-linking agent or agents. These covulcanization or accelerating agents may themselves act as vulcanization agents. It is within the teachings of this art that such chemical components may be a component of the anhydrous liquid cross-linking agents composition. Examples of but not limited to such covulcanization agents or accelerators would be generally classified as:

Urea;

Stearic Acid;

Polyethylene or other Glycols;

Aldehyde Amines;

Dithiocarbamates such as but not limited to Zinc Dibutyl Dithiocarbamate, Zinc Diethyl Dithiocarbamate, Bismuth dimethyl Dithiocarbamate, Copper Dimethyl Dighiocarbamate, Dimethyl Cyclohexyl Ammonium Dibutyl Dithiocarbamate (an ambient temperature vulcanization accelerator), Tellurium Diethyl Dithiocarbamate, Zinc Dibenzyl Dithiocarbamate, Zinc Pentamethylene Dithiocarbamate, Zinc Dibutyl Dithiocarbamate Dibutylamine complexes;

Guanidiens such as but not limited to Diortho Tolyl Guanidine, Diphenyl Guanidine;

Sulfenamides such as but not limited to N-T-Butyl Benzothiazole Sulfenamide, N-Cyclohexyl Benzothiazole Sulfenamide, Thiocarbamyl Sulfenamide, Benzothiazyl 1-2-Dicyclohexyl Sulfenamide, N-Oxydiethylene Benzothiazole Sulfenamide;

Thioureas such as but not limited to Dibutyl Thiourea, N,N'Diethyl Thiourea, Ethylene Thiourea, 1,2-Diphenyl-2-Thiourea (Thiocarbanilide);

Thiurams such as but not limited to Dipentamethylene Thiuram Hexasulfide, Tetrabutyl Thiuram Disulfide, Tetrabenzylthiuram Disulfide, Tetraethyl Thiuram Disulfide,Tetramethyl Thiuram Disulfide, Tetramethyl Thiuram Monosulfide, Tetramethyl/Ethyl Thiuram Disulfide;

Other known accelerators and activators but not limited to 3-Methyl-Thiazolidinethione-2, 4,4'Dithiodimorpholine, Zinc Dibutyl Phosphorodithiate, Zinc-Amine Dithiophosphate compleses, Xanthogen Polysulfide, Zinc Diacrylates, Magnesium or Zinc hydroxide and Magnesium or Zinc Oxide or other Group IA or Group IIA Elements of the Periodic Table of Elements and their hydroxides or oxides or other Group VIA Elements of the Periodic Table of Elements;

Or other like or similar accelerators and or activators that may or may not be combined, dispersed or otherwise dispensed in combined solid or liquid form.

Chemical moieties containing Group VIA Elements of the Periodic Table Elements are also within the purview of the teaching disclosed herein. Non-limiting examples of such Group VIA elements and chemical moieties are:

Elemental sulfur in various forms;
Elemental oxygen either as a gas or as a peroxide
Elemental selenium
Elemental tellurium Each of these elements or chemical moieties of these elements of Group VIA are known to be soluble in various liquids or polymers. Depending upon the Group VIA element form, solubility may be greater for one form verses another. Typical of but not limited to this understanding are the various forms of elemental sulfur. By non-limiting example, elemental sulfur may be of the rhombic or amorphous form. These two forms of sulfur are knows respectively known as soluble and insoluble in rubber. Therefore, it is now within one of average skill in the art that either form of sulfur may be used within the teachings disclosed herein.

The concept of solubility has been found to have surprising utility herein. It has been found that a suitable anhydrous cross-linking or vulcanization agent may be composed of dissolving and or suspending one or more elements of Group VIA of the Periodic Table of Elements, a liquid at ambient temperature polymer and optionally other vulcanization or covulcanization agents and or polysulfides and or various solvents and or oils. The combinations of these components yield a product that is fluid and liquid at ambient temperatures.

By non-limiting example of one of the preferred embodiments of the art and to illustrate the process of forming a ambient temperature anhydrous liquid cross-linking agent the following components were blended:

30.000 grams (60%) of elemental sulfur
7.500 grams (15%) of Di-tert-butyl polysulfide which contains approximately 54% poly-sulfur
7.500 grams (15%) of Neodecanoic acid, oxiranylmethyl ester
10.000 grams (10%) of paraffinic process oil derived from the refining of crude oil having approximately 113 Saybolt Universal Seconds viscosity at 100° F. per ASTM D2161

Sample No. 01—A 5-gallon sample of polymer and asphalt was made and divided into quart cans in the manner described above. The asphalt was a 150 to 200 penetration grade from a typical crude oil refining practice. The polymer use level was 3.00% by weight. The polymer is commercially available and known in the art as a tapered di-block SB polymer composed of 15% styrene by total weight of the polymer with 10% of the total polymer as a block styrene segment leaving 5% of the total polymer as a random or tapered styrene segment. The polymer at 5.24% in toluene having a viscosity of 58.0 centipoise. A quart sample was selected at random and designated as representative of this Sample No. 01, the control sample. A Force-Ductility was run on the representative Sample No. 01 control sample. The results of this test are shown in FIG. 1 and Table 1. FIG. 1 shows a typical Force-Ductility plot when the maximum force after the initial force ($f_b$) is not at the same elongation as or close to (within two to four centimeters) of the maximum elongation. This is also reflected in that the data of Table 1 where the elongation of $f_b$ is 70.00 centimeters while maximum elongation is 95.00 centimeters.

Sample No 12—To a randomly selected Sample No. 01 quart can, 0.20% by weight dry phosphoric acid was added under the prescribed mixing conditions above. The key data points of a Force-Ductility test are shown in Table 1. This sample is illustrative of known art.

Sample No. 13—To a randomly selected Sample No. 01 quart can, 0.15% of one of the preferred embodiments of the Liquid at Ambient Temperature Cross-linking Formula shown was added 0.20% by weight dry phosphoric acid was added under the prescribed mixing conditions above. The key data points of a Force-Ductility test are shown in Table 1.

Sample No. 14—To a randomly selected Sample No. 01 quart can, 0.15% of the same Liquid at Ambient Temperature Cross-linking Formula as was used in Sample No. 13 was added. The key data points of a Force-Ductility test are shown in Table 1.

Sample No.'s 12, 13 and 14 collectively illustrate the practical utility of a Liquid at Ambient Temperature Cross-linking agent in combination with known art use of phosphoric acid or without the presence of phosphoric acid. More specifically, Sample No. 13 has a $f_a/f_b$ ratio of 0.9108 while Sample No. 14 has a 0.6373 a $f_a/f_b$ ratio. Yet the $f_2/f_1$ ratio for Sample No.'s 13 and 14 are 0.5423 and 0.6055 respectively. It is also understood that from this data it is now possible for one of average skill in the art to further decrease, increase modify or change the ratio of components of a Liquid at Ambient Temperature Cross-linking Formula as disclosed herein in combination with various amounts of inorganic phosphorous to create enhancements to polymer modified asphalt.

Sample No. 15 teaches one of the preferred embodiments illustrating that only Group VIA elements of the Periodic Table of Elements along with a poly-sulfide and a oil may be used to create a suitable Liquid at Ambient Temperature Cross-linking agent. To a randomly selected Sample No. 01 quart can, 0.15% of the Liquid at Ambient Temperature Cross-linking Formula shown was added and mixed according to previous description. The results of the Force-Ductility test are shown in FIG. 2 and illustrate a plot of the data when the maximum force after the initial force ($f_b$) is at the same elongation as or close to (within two to four centimeters) of the maximum elongation. When data from Sample Number 15 is compared to the control Sample No. 1 indication of a reaction between the components of the Liquid at Ambient Temperature Cross-linking Formula shown and the polymer and asphalt occurred. This reaction is evident by examining the $f_2/f_1$ and $f_a/f_b$ ratio of Sample Number 01 at 0.3834 and 0.5945 respectively and Sample Number 15 at 0.6374 and 0.7143 respectively.

Sample Number 16R—To a randomly selected Sample No. 01 quart can, 0.15% of the Liquid at Ambient Temperature Cross-linking Formula shown was added and mixed according to previous description. When data from Sample Number 16R is compared to the control Sample No. 1 indication of a reaction between the components of the Liquid at Ambient Temperature Cross-linking Formula shown and the polymer and asphalt occurred. This reaction is evident by examining the $f_2/f_1$ and $f_d/f_b$ ratio of Sample Number 01 at 0.3834 and 0.5945 respectively and Sample Number 16R at 0.6321 and 0.6599 respectively. This Liquid at Ambient Temperature Cross-linking Formula illustrates the utility of combining Group VIA elements of the Periodic Table of Elements along with a poly-sulfide and a phenol may be used to create a suitable Liquid at Ambient Temperature Cross-linking agent.

Sample Number 17—To a randomly selected Sample No. 01 quart can, 0.15% of the Liquid at Ambient Temperature Cross-linking Formula shown was added and mixed according to previous description. When data from Sample Number 17 is compared to the control Sample No. 1 indication of a reaction between the components of the Liquid at Ambient Temperature Cross-linking Formula shown and the polymer and asphalt occurred. This reaction is evident by examining the $f_2/f_1$ and $f_d/f_b$ ratio of Sample Number 01 at 0.3834 and 0.5945 respectively and Sample Number 17 at 0.6313 and 0.6372 respectively. This Liquid at Ambient Temperature Cross-linking Formula illustrates the utility of combining Group VIA elements of the Periodic Table of Elements along with a poly-sulfide and a glycidyl (Neodecanoic acid, oxiranylmethyl ester) may be used to create a suitable Liquid at Ambient Temperature Cross-linking agent.

Sample Number 20—To a randomly selected Sample No. 01 quart can, 0.15% of the Liquid at Ambient Temperature Cross-linking Formula shown was added and mixed according to previous description. When data from Sample Number 20 is compared to the control Sample No. 1 indication of a reaction between the components of the Liquid at Ambient Temperature Cross-linking Formula shown and the polymer and asphalt occurred. This reaction is evident by examining the $f_2/f_1$ and $f_d/f_b$ ratio of Sample Number 01 at 0.3834 and 0.5945 respectively and Sample Number 20 at 0.6215 and 0.6661 respectively. This Liquid at Ambient Temperature Cross-linking Formula illustrates the utility of combining Group VIA elements of the Periodic Table of Elements along with a poly-sulfide and a functionalized liquid polymer (>—OH terminated polybutadiene) may be used to create a suitable Liquid at Ambient Temperature Cross-linking agent.

Sample Number 21—To a randomly selected Sample No. 01 quart can, 0.15% of the Liquid at Ambient Temperature Cross-linking Formula shown was added and mixed according to previous description. When data from Sample Number 21 is compared to the control Sample No. 1 indication of a reaction between the components of the Liquid at Ambient Temperature Cross-linking Formula shown and the polymer and asphalt occurred. This reaction is evident by examining the $f_2/f_1$ and $f_d/f_b$ ratio of Sample Number 01 at 0.3834 and 0.5945 respectively and Sample Number 21 at 0.6542 and 0.6369 respectively. This Liquid at Ambient Temperature Cross-linking Formula illustrates the utility of combining Group VIA elements of the Periodic Table of Elements along with a poly-sulfide and a liquid copolymer may be used to create a suitable Liquid at Ambient Temperature Cross-linking agent.

In the previously described manner another five-gallon portion of polymer modified asphalt was prepared with the same asphalt and a different polymer. In this sample, the polymer was a multi-branched block SBS polymer composed of 43% styrene by total weight of the polymer. The polymer at 5.00% in toluene has a viscosity of about 4,100 centipoise. A quart sample was selected at random and designated as representative of this lot and labeled Sample No. 31, the control sample.

Sample No. 31—A Performance Grade analysis was performed on the randomly selected sample to represent this lot of polymer modified asphalt. The data for the Actual Performance Grade that details the exact upper and lower intercept temperature of a given performance level is listed in the Table 2 below.

Sample No. 47—To a randomly selected Sample No. 31 quart can, 0.15% of the same Liquid at Ambient Temperature Cross-linking Formula as was added and mixed according to previous description. The data for the Actual Performance Grade that details the exact intercept temperature of a given performance level is listed in the Table 2 below.

By comparison of the Actual Performance Grade (PG) upper and lower intercept temperatures of Sample No. 31 to Sample No. 47 at PG65.6-23.7 and PG7.0-28.1, respectively, it may be seen that both the upper and lower intercept temperatures have been enhanced by the addition of the Liquid at Ambient Temperature Cross-linking Agent formula described in Sample No. 47 below. It is now obvious that a Liquid at Ambient Temperature Cross-linking agent may be formed by combining Group VIA elements with a liquid polysulfide to create an acceptable product of surprising utility.

TABLE 2

| Actual Performance Grade of Sample No. 31 and 47 | | |
|---|---|---|
| Parameter/Weight %/ Sample Number | Sample No. 31 | Sample No. 47 |
| Liquid at Ambient Temp. X-link Formula, % | Control | 0.15 |
| Group VIA Element, Sulfur | Asphalt + Polymer | 40.00 |
| Di-tert-nonyl polysulfide | Control | 60.00 |
| Upper Intercept Temperature, °C. | +65.6 | +70.0 |
| Lower Intercept Temperature, °C. | −23.7 | −28.1 |
| Δ (U − L) Intercept Temperature, °C. | 89.3 | 98.1 |

Sample No. 54—A concentration of 15% of a commercially available polybutadiene characterized by having a viscosity of 250 centipoise at 5.43% in toluene was blended in the same asphalt as used in Sample No. 47 in a quart can using a high shear Gifford-Woods Model 1L mixer available from Chemineer Company Incorporated. Once homogeneous, the product was diluted to 10.00% concentration with the same asphalt as Sample No. 46 in a separate quart can at about 225° C. A rotational viscosity according to ASTM D4402 at 225° C. was measured and found to be about 1956 mega-Pascal seconds. This data is shown in Table 3 below.

Sample No. 55—To the contents of Sample No. 54 the following Liquid at Ambient Temperature Cross-linking formulation was added at 0.05% use level and about 225° C. temperature. The rotational viscosity was recorded after twenty minutes mixing as being infinitely thick. This data is shown in Table 3 below.

TABLE 3

Rotational Viscosity at 225° C.

| Parameter/Weight %/Sample Number | Sample No 54 | Sample No 55 |
|---|---|---|
| Group VIA Element, Sulfur | Control | 40.00 |
| Di-tert-butyl polysulfide | Asphalt + | 25.0 |
| Lecithin | Polymer | 35.00 |
| Rotational Viscosity at 225° C., Spindle #27 | 1956 | ∞ |

The result of comparing the rotational viscosity of these two samples indicate that as little as about 0.0200% (0.05%×40.00%) by weight of a Group VIA element and about 0.0125% (0.05%×25.00%) of a polysulfide and about 0.0175% (0.05%×35%) an oil may be present in a final product to effectively enhance the product after only about 20 minutes or less mixing.

Sample No. 58—To a representative portion of Sample Number 31, 0.50% of a radial SBS polymer consisting of 30% styrene and having a rotational viscosity of 19 Pascal seconds at 25% loading per ASTM D2857 was a added using a high shear Gifford-Woods Model 1L mixer available from Chemineer Company Incorporated and mixed at 180° C. for 94 minutes until homogenous. This sample was converted to Sample Number 59 by the addition of a Liquid at Ambient Temperature Cross-linking agent to the preferred embodiment.

Sample No. 59—To the contents of Sample Number 58 was added 2.50% of a Liquid at Ambient Temperature Cross-linking agent consisting of 60.00% of the Group VIA element Sulfur and 40.00% of a isobutylene/butene copolymer having a Kinematic Viscosity of 27 to 33 centistokes at 38° C. by ASTM D445. The data in Table 4 below was recorded at sixty, one-hundred twenty and one-hundred eighty minute time intervals from the addition of the cross-linking agent accordance with ASTM D4402 at 135° C. with Spindle No. 27 for Rotational Viscosity.

TABLE 4

Rotational Viscosity at 135° C.

| Time, minutes | Rotational Viscosity, mPa – s |
|---|---|
| 0 | 338 |
| 60 | 369 |
| 120 | 398 |
| 180 | 444 |

From the data of Table 4, it is now obvious to one of average skill in the art that as little as about 0.50% or less of a polymer may be used in combination with cross-linking agents of the composition disclosed herein to create useful polymer modified asphalt products or products wherein the cross-linking of polymers is employed.

Sample No. 69—An asphalt having the performance grade of PG64-28 was combined with 3.00% of a linear SBS polymer containing 31% styrene and having a Melt Flow Rate of 6 at 200° C., 10 Kg and 0.1564 capillary size. The asphalt and polymer mixture was blended as described above for quart can blends. This product was used as a control for the data presented in Table 5 below.

Sample No. 74—To a sample of polymer modified asphalt prepared according to Sample Number 69, a Liquid at Ambient Temperature Cross-linking agent of the formula shown in Table 5 was added. The isobutylene/butene copolymer was the same as that used in Sample Number 59. In the cross-linking formula is a known vulcanization accelerator Tetramethyl Thiuram Disulfide. The Actual Performance Grade (PG) upper and lower intercept temperatures results of the addition of this disclosed art is shown in Table 5 below.

Sample No. 75—To a sample of polymer modified asphalt prepared according to Sample Number 69, a Liquid at Ambient Temperature Cross-linking agent of the formula shown in Table 5 was added. The isobutylene/butene copolymer was the same as that used in Sample Number 59. In the cross-linking formula is a known vulcanization accelerator Tetrabutylthiuram disulfide, which is a liquid at ambient temperature. The Actual Performance Grade (PG) upper and lower intercept temperatures results of the addition of this disclosed art is shown in Table 5 below.

Sample No. 76—A sample of polymer modified asphalt was prepared according to Sample Number 69 except that when the Liquid at Ambient Temperature Cross-linking agent was added the process temperature was reduced to 130° C. and the sample was stored in a 120° C. to 125° C. oven overnight. The results of this sample and the composition of this Liquid at Ambient Temperature Cross-linking agent is shown in Table 5 was added. The isobutylene/butene copolymer was the same as that used in Sample Number 59. In the cross-linking formula is the vulcanization accelerator or agent Dimethyl Cyclohexyl Ammonium Dibutyl Dithiocarbamate, which is known to be a room temperature vulcanization accelerator or agent. The Actual Performance Grade (PG) upper and lower intercept temperature results of the addition of this disclosed art are also shown in Table 5 below. By the incorporation of this room temperature accelerator, it is now anticipated that polymer modified asphalt or polymer products manufactured by vulcanization may be made by processing at ambient temperatures.

TABLE 5

Actual Performance Grade of Sample Using Vulcanization Accelerators

| Parameter/Weight %/Sample Number | 69 | 74 | 75 | 76 |
|---|---|---|---|---|
| Liquid at Ambient Temp. X-link Formula, % | Control | 0.15 | 0.15 | 0.15 |
| Group VIA Element, Sulfur | Asphalt | 50.00 | 50.00 | 50.00 |
| Copolymer Isobutylene/butyene | And | 45.00 | 45.00 | 45.00 |
| Tetramethyl Thiuram Disulfide | Polymer | 5.00 | | |
| Tetrabutylthiuram disulfide | Only | | 5.00 | |
| Dimethyl Cyclohexyl Ammonium Dibutyl Dithiocarbamate | Control | | | 5.00 |
| Upper Intercept Temperature, ° C. | +74.6 | +78.8 | +79.3 | +79.3 |
| Lower Intercept Temperature, ° C. | −22.9 | −27.8 | −27.9 | −25.8 |
| Δ (U − L) Intercept Temperature, ° C. | 97.5 | 106.6 | 107.2 | 105.1 |

From the data in Table 5, it is now obvious to one skilled in the art that several types of accelerators, whether liquid, solid or act as room temperature agents, may be incorporated into the new art disclosed herein. It is also shown that accelerators or co-vulcanization agents may enhance both the useful temperature range of a polymer modified asphalt as shown by the Δ(U-L) Intercept Temperature for the control being lowest at 97.5 degrees of the four samples.

Sample No. 91—To a sample of polymer modified asphalt prepared according to Sample Number 69, a Liquid at Ambient Temperature Cross-linking agent of the formula shown in Table 6 was added. This embodiment of the new art illustrates its ability to accommodate Oxidation/Reduction chemicals. The Oxidation and Reduction chemicals are Iron Chloride and Iron Sulfate. From the data presented in Table 6, it is shown that Oxidation and Reduction chemicals may be incorporated into the new art disclosed herein and it is now anticipated that polymer modified asphalt or polymer products manufactured by vulcanization may or can be used with Oxidation and Reduction chemicals.

TABLE 6

Actual Performance Grade Using Oxidation and Reduction Chemicals

| Parameter/Weight %/Sample Number | 69 | 91 |
|---|---|---|
| Liquid at Ambient Temp. X-link Formula, % | Control | 0.15 |
| Group VIA Element, Sulfur | Asphalt | 40.00 |
| Di-tert-dodecyl polysulfide | And | 14.00 |
| Iron Sulfate | Polymer | 8.00 |
| Iron Chloride | Only | 8.00 |
| Vegetable Oil | Control | 16.00 |
| Upper Intercept Temperature, ° C. | +74.6 | +76.2 |
| Lower Intercept Temperature, ° C. | −22.9 | −28.1 |
| Δ (U − L) Intercept Temperature, ° C. | 97.5 | 104.3 |

It is also shown that Oxidation and Reduction chemistry enhanced both the useful temperature range of a polymer modified asphalt as shown by the Δ(U-L) Intercept Temperature for the control being lower at 97.5 degrees and the Lower Intercept Temperature higher at −22.9° C. as opposed to Sample No. 91 having 104.3 degrees and −28.1° C. respectively.

Whereas, the present invention has been described in relation to the drawings attached hereto, it should be understood that other and further modifications, apart from those shown or suggested herein, may be made within the spirit and scope of this invention.

pound having sulfur, oxygen, or selenium therein, and said polymer are dissolvable or digestible in asphalt to react under heat of from greater than 110?C. to produce a cross-linked polymer modified asphalt.

2. A cross-linking compound as set forth in claim 1 wherein said polymer is saturated.

3. A cross-linking compound as set forth in claim 1 wherein said polymer contains functional groups.

4. A cross-linking compound as set forth in claim 1 wherein said polymer is hydroxy terminated polybutadiene.

5. A cross-linking compound as set forth in claim 1 including aldehyde, phenol, phenol-aldehyde, melamine or epoxy resins.

6. A cross-linking compound as set forth in claim 5 wherein said epoxy resins contains glycidyl moieties.

7. A cross-linking compound as set forth in claim 5 wherein said polymer is hydroxy terminated polybutadiene.

8. A cross-linking compound as set forth in claim 5 including additional cross-linking agents of aldehydes, phenols, phenol-aldehydes, melamine resins or epoxy resins.

9. A cross-linking compound as set forth in claim 8 wherein said epoxy resin contains glycidyl moieties.

10. A cross-linking compound as set forth in claim 9 wherein the glycidyl moiety is neodecanoic acid, oxiramylmethyl ester.

11. A cross-linking compound as set forth in claim 1 including vulcanization accelerators or co-reactant.

12. A cross-linking compound as set forth in claim 11 wherein the accelerator or co-reactant is Tetramethyl Thiuram Disulfide.

TABLE 1

Force-Ductility Data

| Parameter/Weight %/Sample No. | 01 | 12 | 13 | 14 | 15 | 16R | 17 | 20 | 21 |
|---|---|---|---|---|---|---|---|---|---|
| Liquid at Ambient Temp. X-link Formula, % | | 0.15 | 0.15 | 0.15 | 0.15 | 0.15 | 0.15 | 0.15 | 0.15 |
| Group VIA Element, Sulfur | Asphalt | 42 | 42 | 40 | 40 | 40 | 40 | 40 | 50 |
| Di-tert-dodecyl polysulfide | Plus | 25 | 25 | | | | | | |
| Di-tert-butyl polysulfide | | | | 25 | 25 | 25 | 25 | 25 | 15 |
| Aromacic Process Oil | | | | | 35 | | | | |
| 32% Phenolic Resin | SBS | | 33 | 33 | | 35 | | | |
| Neodecanoic acid, oxiranylmethyl ester | | | | | | | 35 | | |
| >−OH Function 1,3-Butadiene homopolymer | Only | | | | | | | 35 | |
| Isobutylene/butene copolymer | | | | | | | | | 35 |
| Phosphoric Acid | Control | 0.20 | 0.20 | | | | | | |
| Initial Peak Force, $f_1$, lb/cm³ | 8.36 | 7.83 | 7.80 | 7.63 | 8.99 | 8.67 | 8.38 | 8.11 | 6.68 |
| Minimum Force after $f_1 = f_a$, lb/cm³ | 2.61 | 3.28 | 3.88 | 3.62 | 4.45 | 4.23 | 3.97 | 3.95 | 3.28 |
| Elongation at Minimum Force after $f_1 = f_a$ | 30.00 | 30.00 | 30.00 | 30.00 | 30.00 | 30.00 | 30.00 | 30.00 | 30.00 |
| Maximum Force after $f_1 = f_b$, lb/cm³ | 4.39 | 5.06 | 4.26 | 5.68 | 6.62 | 6.41 | 6.23 | 5.93 | 5.15 |
| Elongation at Maximum Force after $f_1 = f_b$ | 70.00 | 70.00 | 60.00 | 65.00 | 60.00 | 60.00 | 60.00 | 60.00 | 60.00 |
| 30 cm Elongation Force, lb/cm³, $f_2$ | 3.21 | 3.91 | 4.23 | 4.62 | 5.73 | 5.48 | 5.29 | 5.04 | 4.37 |
| Maximum Elongation Force, $f_c$, lb/cm³ | 4.11 | 5.00 | 3.43 | 5.68 | 6.38 | 6.37 | 6.21 | 5.69 | 5.07 |
| Maximum Elongation, cm | 95.00 | 71.50 | 61.50 | 65.50 | 61.75 | 65.50 | 66.75 | 62.75 | 63.50 |
| Ratio of $f_2/f_1$ | 0.3840 | 0.4994 | 0.5423 | 0.6055 | 0.6374 | 0.6321 | 0.6313 | 0.6215 | 0.6542 |
| Ratio of $f_a/f_b$ | 0.5945 | 0.6482 | 0.9108 | 0.6373 | 0.7143 | 0.6599 | 0.6372 | 0.6661 | 0.6369 |

What is claimed is:

1. A cross-linking compound which comprises: (a) an anhydrous hydrocarbon compound liquid at ambient temperature having elemental sulfur, oxygen or selenium therein, wherein said hydrocarbon compound is Di-tert-butyl polysulfide, Di-tert-dodecyl polysulfide, Di-tert-nonyl polysulfide or combinations thereof; and (b) an ethylenic polymer liquid at ambient temperature having a molecular weight less than 25,000, wherein said polymer is a copolymer of butylene and butene, wherein said anhydrous com- 13. A cross-linking compound as set forth in claim 11 wherein the accelerator or co-reactant is Tetrabutylthiuram Disulfide.

14. A cross-linking compound as set forth in claim 11 wherein the accelerator or co-reactant is a room temperature accelerator or co-reactant.

15. A cross-linking compound as set forth in claim 11 wherein the accelerator or co-reactant is Dimethyl Cyclohexyl Ammonium Dibutyl Dithiocarbamate.

16. A cross-linking compound as set forth in claim 11 including organic oils or solvents.

17. A cross-linking compound as set forth in claim 16 wherein the organic oils or solvents are derived from natural oils.

18. A cross-linking compound as set forth in claim 17 wherein the natural oils are of either animal or vegetable origin.

19. A cross-linking compound as set forth in claim 17 wherein the oil is of vegetable origin.

20. A cross-linking compound as set forth in claim 16 wherein the organic oils or solvents contain elements of Group V-A of the periodic table of elements.

21. A cross-linking compound as set forth in claim 20 wherein the Group V-A elements contained in said oils or solvents is either phosphorous or nitrogen or both.

22. A cross-linking compound as set forth in claim 21 wherein said oils or solvents containing both phosphorous and nitrogen is lecithin.

23. A cross-linking compound as set forth in claim 1 which includes chemical moieties capable of forming an oxidation-reduction reaction.

24. A cross-linking compound as set forth in claim 23 wherein the chemical moieties capable of forming a oxidation-reduction reaction are iron sulfate and iron chloride.

25. A cross-linking compound as set forth in claim 1 wherein said anhydrous hydrocarbon compound is an organic process oil from crude or coal processing.

* * * * *